(12) United States Patent
Owen et al.

(10) Patent No.: US 7,552,170 B2
(45) Date of Patent: Jun. 23, 2009

(54) APPARATUS AND METHOD FOR AGGREGATING WEB SERVICES

(75) Inventors: Russell Norman Owen, Waterloo (CA); David Paul Yach, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 889 days.

(21) Appl. No.: 10/786,018

(22) Filed: Feb. 26, 2004

(65) Prior Publication Data

US 2005/0193057 A1 Sep. 1, 2005

(51) Int. Cl.
*G06F 15/16* (2006.01)
(52) U.S. Cl. .................................. 709/203
(58) Field of Classification Search ............ 709/201, 709/203; 715/744
See application file for complete search history.

(56) References Cited

U.S. PATENT DOCUMENTS

| | | | |
|---|---|---|---|
| 6,424,968 B1 * | 7/2002 | Broster et al. ................ 707/3 |
| 6,560,633 B1 * | 5/2003 | Roberts et al. ............. 709/202 |
| 7,151,966 B1 * | 12/2006 | Baier et al. .................. 700/19 |
| 2003/0009464 A1 * | 1/2003 | Campbell et al. ............. 707/10 |
| 2003/0055868 A1 | 3/2003 | Lindquist et al. |
| 2003/0154346 A1 * | 8/2003 | Gruner et al. ............... 711/130 |
| 2003/0225825 A1 * | 12/2003 | Healey et al. ............... 709/203 |
| 2004/0003033 A1 * | 1/2004 | Kamen et al. .............. 709/203 |
| 2004/0030740 A1 * | 2/2004 | Stelting ...................... 709/201 |
| 2004/0064529 A1 * | 4/2004 | Meredith et al. ............ 709/219 |
| 2004/0148334 A1 * | 7/2004 | Arellano et al. ............. 709/201 |
| 2004/0193713 A1 | 9/2004 | Tan et al. |
| 2005/0038867 A1 * | 2/2005 | Henderson et al. .......... 709/217 |
| 2005/0086330 A1 * | 4/2005 | Perham et al. .............. 709/220 |
| 2005/0193057 A1 | 9/2005 | Owen et al. |
| 2006/0036682 A1 * | 2/2006 | Fletcher et al. ............. 709/203 |

FOREIGN PATENT DOCUMENTS

CN 1947404 4/2007

OTHER PUBLICATIONS

European Patent Examination for Application 04 251 097.4-2201 dated Nov. 7, 2005.
Curbera, Francisco et al., "Unraveling the Web Services Web", IEEE Internet Computing, IEEE Service Center, New Jersey, United States, Apr. 2002, pp. 86-93.
Written Opinion—International Application No. PCT/GB2005/050025.
International Search Report.
Shahram Ghandeharizadeh, Craig A. Knoblock, Christos Papadopoulos "Proteus: A System for Dynamically Composing and Intelligently Executing Web Services" Online! 2003, pp. 1-5, XP002334518 First International Conference on Web Services, Las Vegas Jun. 23-26, 2003 Retrieved from the internet URL: http://dblab.usc.edu/Users/shkim/papers/proteus.pdf> retrieved on Jul. 4, 2005.

(Continued)

*Primary Examiner*—Andrew Caldwell
*Assistant Examiner*—Jason Recek
(74) *Attorney, Agent, or Firm*—Bereskin & Parr LLP

(57) ABSTRACT

An apparatus and method for aggregating web services in generating a user interface for a computing device. Web service descriptions are received that define a web service interface to each of a plurality of web services. The web service descriptions are processed to identify inputs to first web services obtainable by invoking one or more second web services. A user interface is generated for the computing device that aggregates these first and second web services. By identifying instances in which the input to one web service may be obtained by invoking another web service, a user interface which aggregates these web services may be automatically generated.

18 Claims, 7 Drawing Sheets

OTHER PUBLICATIONS

Brahim Medjahed, Athman Bouguetta, "Composing Web services on the Semantic Web" The VLDB Journal (2003) 12, Online! Nov. 2003, pp. 333-351, XP002334523 Retrieved from internet: URL: http://delivery.acm.org/10.1145/960000/953243/30120333.pdf?key1=953243&key2=4885840211&coll=GUIDE&dl=ACM&CFID=49304166&CFTOKEN=54977389> retrieved on Jul. 4, 2005.

Tse-Ming Tsai et al: "Semantic modeling among web services interfaces for services integration—SOTA (smart office task automation) platform" Database and Expert Systems Applications 2003. Proceedings. 14th International Workshop on Sep. 1-5, 2003.

European Examination Report. Application No. 04251097.4 Dated: Sep. 20, 2007.

Singapore Written Opinion. Application No. 200605792-1 Dated: Oct. 1, 2007.

Schummer, Till "Lost and Found in Software Space", Proceedings of the 34th Hawaii International Conference on System Sciences—2001.

Espinoza, Fredrik and Hamfors, Ola "ServiceDesigner: A Tool to Help End-Users Become Individual Service Providers", Proceedings of the 36th Hawaii International Conference on System Sciences -2002.

Canadian First Office Action. Application No. 2,498,375 Dated: Oct. 31, 2007.

European Search Report. Application No. 04251097.4. Dated: Jun. 7, 2004.

European Summons to Attend Oral Proceedings Pursuant to Rule 115(1) EPC. Application No. 04251097.4. Dated: Jul. 31, 2008.

Raposo, J. et al., "A Web Agent for Automating E-Commerce Operations", Proceedings of the IEEE International Conference on E-Commerce, Published on Jun. 24, 2003.

Indian Examination Report. Application No. 4889/DELNP/2006. Dated: Dec. 8, 2008.

* cited by examiner

APPARATUS AND METHOD FOR AGGREGATING WEB SERVICES

FIELD OF THE INVENTION

Embodiments of the invention relate generally to web services, and more particularly to a method of aggregating web services in the generation of user interfaces for computing devices.

BACKGROUND OF THE INVENTION

A web service can be generally defined as one or more application functions that can be invoked over the Internet using a protocol. One example of a protocol that may be used in this context is the Simple Object Access Protocol (SOAP), which may be used by Internet-based application servers, also known as web servers, to provide web services. SOAP is a protocol that is often used in the exchange of information in decentralized, distributed network environments.

One goal of web services is to use the infrastructure of the web to provide information that is machine-readable. Unlike traditional client/server models such as a web server/web page system, web services do not typically provide the user with a graphical user interface (GUI), but instead share business logic, data, and processes through a programmatic interface across a network. As applications are capable of interfacing with web services, developers may add web services to a GUI (e.g. a web page or executable program) to offer specific functionality to users.

Furthermore, different applications from different sources can communicate with each other without extensive custom coding, and web services are not associated with any one operating system or programming language. This flexibility allows more sophisticated business-to-business applications as well as more sophisticated browsing models (with more client-side processing of data) to be developed.

For simple applications, it may be sufficient to have a one-to-one relationship between a user action, a page displayed to a user through a user interface on a computing device, and a web service. However, this limitation would typically be overly restrictive for more complex applications. In many applications, a single page displayed to the user represents an aggregation of multiple types of data. Similarly, a single user action may result in several types of data being examined and modified. Many web services are designed to perform small tasks or units of work; this modularity permits aggregation with other web services in the development of applications.

One known solution for aggregating web services is for a programmer to write customized code for a client application that provides this aggregation. Typically, the client application provides the aggregation of web services to provide a meaningful end user experience. However, writing customized client applications requires time and skill. These client applications must usually be distributed to each endpoint (e.g. client computing device) before they can be used. Furthermore, client applications must also be rewritten and specifically customized for each target platform.

SUMMARY OF THE INVENTION

Embodiments of the invention relate generally to web services, and more specifically to methods that facilitate the aggregation of web services, which do not require programmers to write customized code.

In a broad aspect of the invention, there is provided a method of aggregating web services in generating a user interface for a computing device, the method comprising the steps of: receiving at least one web service description, wherein the at least one web service description comprises a plurality of web service description elements that define a web service interface to each of a plurality of web services; processing the at least one web service description to identify a first web service requiring one or more inputs, wherein each input to the first web service is obtainable by invoking a second web service of the plurality of web services; and generating a user interface for the computing device adapted invoke one or more second web services to obtain output data from the one or more second web services; and invoking the first web service, using output data from the second web services as input data to the first web service, to obtain output data from the first web service.

By identifying instances in which the input to one web service may be obtained by invoking another web service, a client application that provides a user interface which aggregates these web services may be automatically generated.

In one embodiment of the invention, various web service description elements contained in one or more web service descriptions contain names of web services and inputs to web services that adhere to a predetermined naming convention. This facilitates a determination of whether an input to one web service may be obtained by invoking another web service.

In another embodiment of the invention, input data is received as input by users to invoke web services, and output data output by invoked web services is displayed to users, through one or more user interfaces. By identifying patterns in the input data input by users and output data displayed to users that suggest that an input to one web service may be obtained by invoking another web service, a new user interface which aggregates these web services can be generated.

In another embodiment of the invention in which input data is received as input by users to invoke web services, and output data output by invoked web services is displayed to user, through one or more user interfaces, specific user interactions (e.g. a copying of output data to an input field) are detected and used to determine whether an input to one web service may be obtained by invoking another web service.

In another embodiment of the invention, a user interface is provided that permits users to explicitly associate web services by identifying which inputs of a specific web service may be obtained by invoking another web service. This information can then be used to generate a new user interface which aggregates these web services.

BRIEF DESCRIPTION OF THE DRAWINGS

These and other features of embodiments of the invention will be made apparent from the following description, with reference to the accompanying drawings, in which.

DETAILED DESCRIPTION OF EMBODIMENTS OF THE INVENTION

Figure 1:
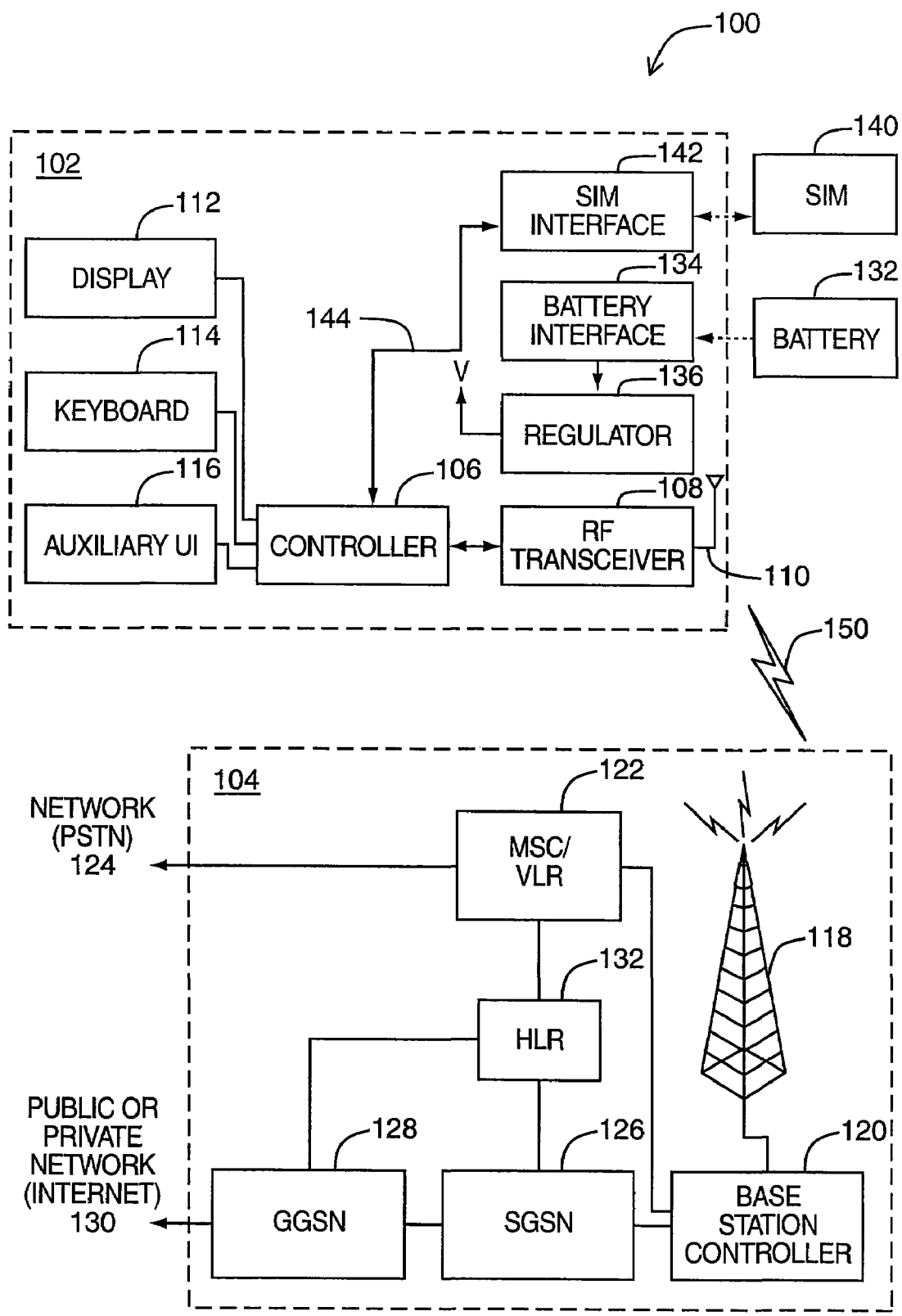
FIG. 1 is a block diagram which illustrates components of a mobile device which communicates within a wireless communication network.

FIG. 1 is a block diagram of a communication system 100, which includes a mobile device 102 that communicates through a wireless communication network 104. Mobile device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU), which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions such as modulation/demodulation and possibly encoding/decoding and encryption/decryption. It will be apparent to those skilled in art that RF transceiver circuitry 108 will be adapted to particular wireless network or networks in which mobile device 102 is intended to operate.

Mobile device 102 includes a battery interface 134 for receiving one or more rechargeable batteries 132. Battery 132 provides electrical power to electrical circuitry in mobile device 102, and battery interface 132 provides for a mechanical and electrical connection for battery 132. Battery interface 132 is coupled to a regulator 136, which regulates power to the device. When mobile device 102 is fully operational, an RF transmitter of RF transceiver circuitry 108 is typically keyed or turned on only when it is sending to a network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 operates using a Subscriber Identity Module (SIM) 140 which is connected to or inserted in mobile device 102 at a SIM interface 142. SIM 140 is one type of a conventional "smart card" used to identify an end user (or subscriber) of mobile device 102 and to personalize the device, among other things. Without SIM 140, the mobile device terminal is not fully operational for communication through wireless network 104. By inserting SIM 140 into mobile device 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile device. SIM 140 may store additional user information for the mobile device as well, including datebook (or calendar) information and recent call information.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 118. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

The wireless link 150 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in art will appreciate that a wireless network in actual practice may include hundreds of cells, each served by a station 118 (or station sector), depending upon desired overall expanse of network coverage. All pertinent components may be connected by multiple switches and routers (not shown), controlled by multiple network controllers.

For all mobile devices 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. A Visitor Location Register (VLR) of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile device 102 or by the fixed transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming GPRS data, or SMS messages over GPRS. In order to send and receive GPRS data, mobile device 102 assists in activating the packet data address that it wants to use. This operation makes mobile device 102 known to GGSN 128; interworking with external data networks can thereafter commence. User data may be transferred transparently between mobile device 102 and the external data networks using, for example, encapsulation and tunneling. Data packets are equipped with GPRS-specific protocol information and transferred between mobile device 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
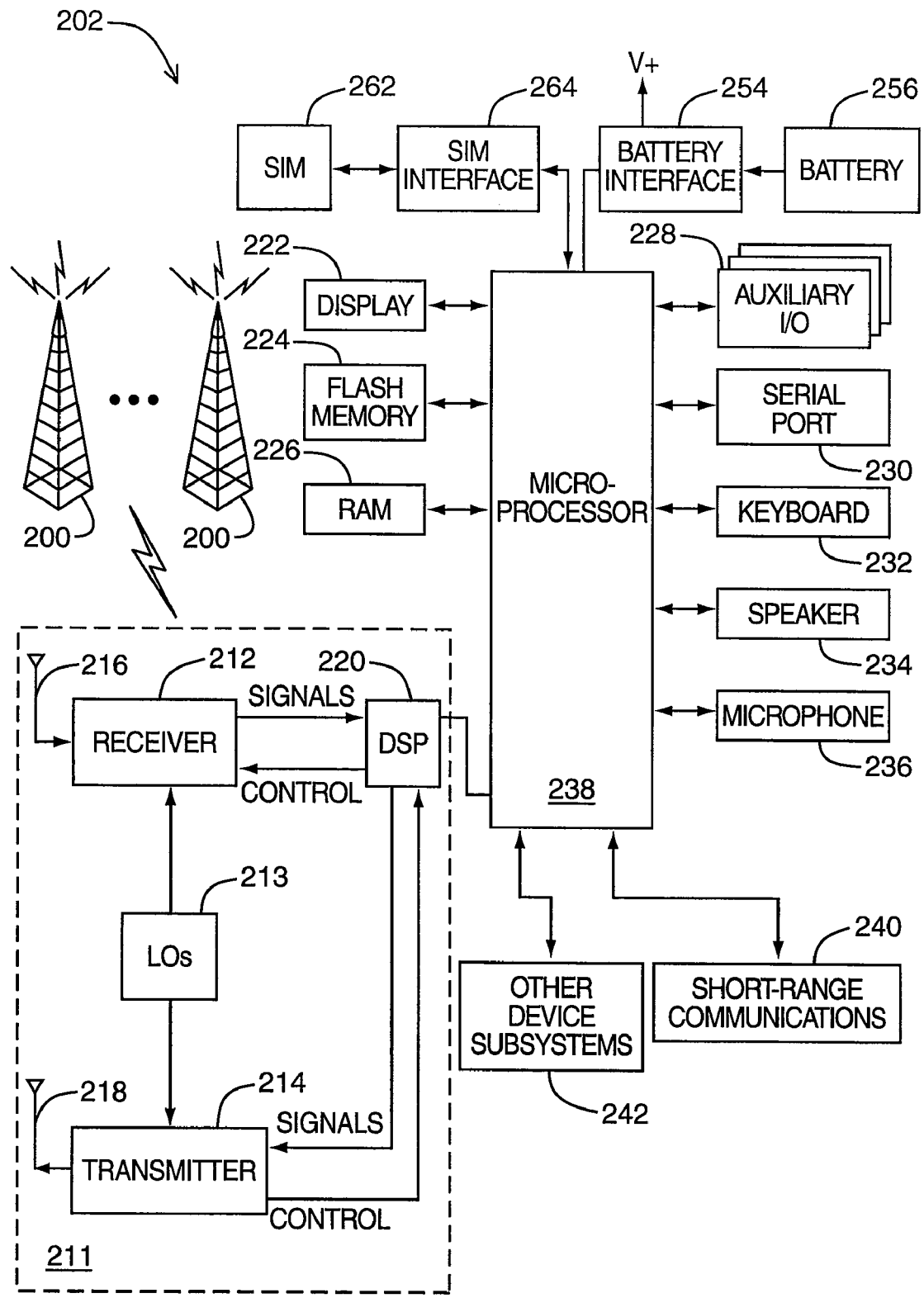
FIG. 2 is a schematic diagram illustrating components of the mobile device of FIG. 1.

FIG. 2 is a detailed block diagram of a mobile device 202 (e.g. mobile device 102 of FIG. 1). Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of fixed transceiver stations 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 requires a Subscriber Identity Module or "SIM" card 262 to be inserted in a SIM interface 264 in order to operate in the network. SIM 262 includes those features described in relation to FIG. 1. Mobile device 202 is a battery-powered device so it also includes a battery interface 254 for receiving one or more rechargeable batteries 256. Such a battery 256 provides electrical power to most, if not all electrical circuitry in mobile device 202, and battery interface 254 provides for a mechanical and electrical connection for it. The battery interface 254 is coupled to a regulator (not shown), which provides power V+ to all of the circuitry.

Mobile device 202 includes a microprocessor 238 (which is one implementation of controller 106 of FIG. 1), which controls overall operation of mobile device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications (such as a network reestablishment scheme), will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system thereby creating a mirrored host computer on mobile device 202 with respect to such items. This is especially advantageous where the host computer system is the mobile device user's office computer system. Additional applications may also be loaded onto mobile device 202 through the communications network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component which provides for communication between mobile device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
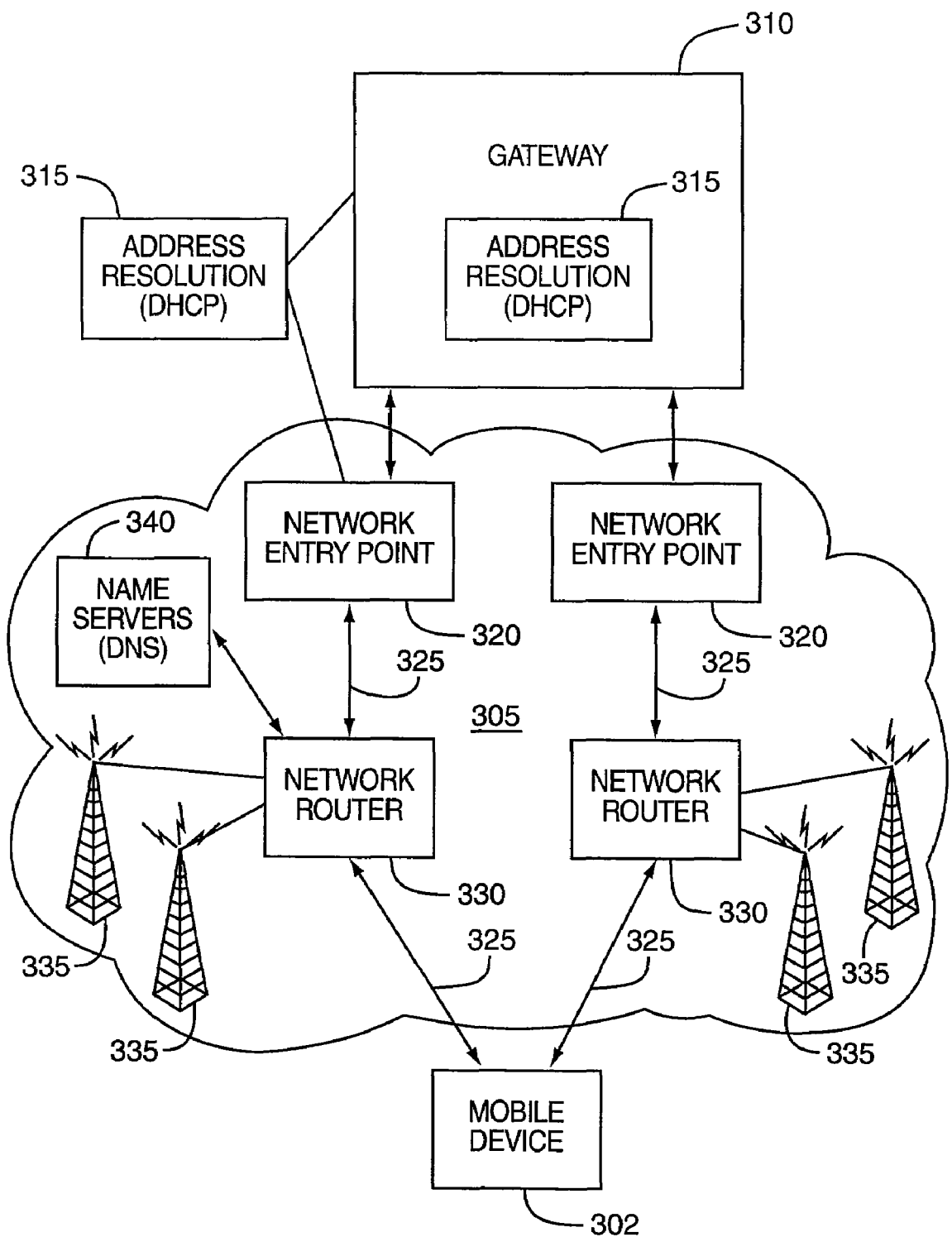
FIG. 3 is an example structure of a system for communication with the mobile device.

FIG. 3 shows an example system structure for communicating with a mobile device. In particular, FIG. 3 shows basic components of one example of an IP-based wireless data network which may be utilized. Mobile device 302 (e.g. mobile device 102 and 202 of FIG. 1 and FIG. 2 respectively) communicates with a wireless packet data network 305, and may also be capable of communicating with a wireless voice network (not shown). As shown in FIG. 3, a gateway 310 may be coupled to an internal or external address resolution component 315 and one or more network entry points 320. Data packets are transmitted from gateway 310, which is a source of information to be transmitted to mobile device 302, through network 305 by setting up a wireless network tunnel 325 from gateway 310 to mobile device 302. In order to create this wireless tunnel 325, a unique network address is associated with mobile device 302. In an IP-based wireless network, however, network addresses are typically not permanently assigned to a particular mobile device 302 but instead are dynamically allocated on an as-needed basis. It is thus preferable for mobile device 302 to acquire a network address and for gateway 310 to determine this address so as to establish wireless tunnel 325.

Network entry point 320 is generally used to multiplex and demultiplex amongst many gateways, corporate servers, and bulk connections such as the Internet, for example. There are normally very few of these network entry points 320, since they are also intended to centralize externally available wireless network services. Network entry points 320 often use some form of an address resolution component 315 that assists in address assignment and lookup between gateways and mobile devices. In this example, address resolution component 315 is shown as a dynamic host configuration protocol (DHCP) as one method for providing an address resolution mechanism.

A central internal component of wireless data network 305 is a network router 330. Normally, network routers 330 are proprietary to the particular network, but they could alternatively be constructed from standard commercially available hardware. The purpose of network routers 330 is to centralize thousands of fixed transceiver stations 335 normally implemented in a relatively large network into a central location for a long-haul connection back to network entry point 320. In some networks there may be multiple tiers of network routers 330 and cases where there are master and slave network routers 330, but in all such cases the functions are similar. Often a network router 330 will access a name server 340, in this case shown as a dynamic name server (DNS) 340 as used in the Internet, to look up destinations for routing data messages. Fixed transceiver stations 335, as described above, provide wireless links to mobile devices such as mobile device 302.

Wireless network tunnels such as a wireless tunnel 325 are opened across wireless network 305 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile device 302 must use a specific technique associated with wireless network 305. The step of opening such a wireless tunnel 325 may require mobile device 302 to indicate the domain, or network entry point 320 with which it wishes to open wireless tunnel 325. In this example, the tunnel first reaches network router 330 which uses name server 340 to determine which network entry point 320 matches the domain provided. Multiple wireless tunnels can be opened from one mobile device 302 for redundancy, or to access different gateways and services on the network. Once the domain name is found, the tunnel is then extended to network entry point 320 and necessary resources are allocated at each of the nodes along the way. Network entry point 320 then uses the address resolution component 315 to allocate an IP address for mobile device 302. When an IP address has been allocated to mobile device 302 and communicated to gateway 310, information can then be forwarded from gateway 310 to mobile device 302.

Wireless tunnel 325 typically has a limited life, depending on mobile device's 302 coverage profile and activity. Wireless network 305 will tear down wireless tunnel 325 after a certain period of inactivity or out-of-coverage period, in order to recapture resources held by this wireless tunnel 325 for other users. The main reason for this is to reclaim the IP address temporarily reserved for mobile device 302 when wireless tunnel 325 was first opened. Once the IP address is lost and wireless tunnel 325 is torn down, gateway 310 loses all ability to initiate IP data packets to mobile device 302, whether over Transmission Control Protocol (TCP) or over User Datagram Protocol (UDP).

Figure 4:
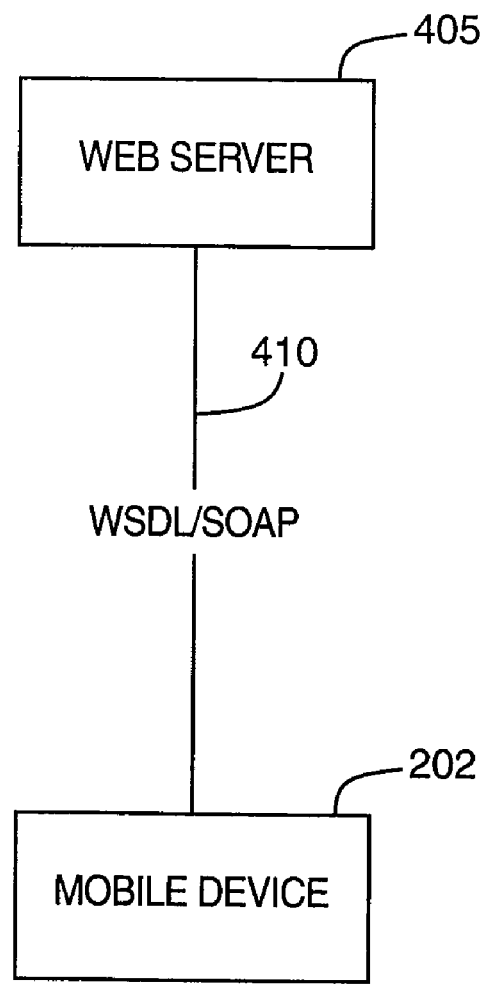
FIG. 4 is a schematic diagram that illustrates a mobile device connected to a web server over a connection in a wireless communication network.

Referring to FIG. 4, there is shown a schematic diagram that illustrates a mobile device 202 connected to a web server 405 over a connection 410 in a wireless data network (e.g. wireless network 305 of FIG. 3). Web server 405 is a provider of web services. Generally, web services are self-contained, self-describing modular applications that can be deployed (i.e. published), located, and invoked across the World Wide Web (the "Web"). Other applications, including other web services, can discover deployed web services and invoke them.

A basic web service platform is based on the Extensible Markup Language (XML) and the Hyper Text Transfer Protocol (HTTP). XML provides a metalanguage in which specialized languages may be written to express complex interactions between clients and services, or between components of a composite service. Web server 405 will typically convert XML messages into a middleware request, and convert results back into XML.

This basic platform is augmented with several other platform services to constitute a more functional platform. A fully-functional web services platform further consists of three additional elements: the Simple Object Access Protocol (SOAP), the Universal Description, Discovery and Integration Service (UDDI) [not shown], and the Web Services Description Language (WSDL).

SOAP is a protocol specification that defines a uniform way of passing data as an XML message. SOAP can be synchronous (e.g. a remote procedure call) or asynchronous (e.g. a message). In particular, SOAP is one example of a protocol that may be used to encode the information in web service requests and response messages before they are sent over a network.

UDDI is used for listing what web services are available, and provides a mechanism for clients to dynamically find specific web services. It is a Web-based distributed directory that enables web service publishers (who have information or services to share) to register themselves, and for clients or web service consumers (who want information or services) to search these registries. When an appropriate web service has been found, a description of this service may be retrieved.

WSDL is a way to describe a web service. More specifically, WSDL provides a way for web service providers to describe the basic format of web service requests over different protocols or encodings. WSDL is an XML description of a web service, which describes what the web service can do, where it resides, and how to invoke it.

In one embodiment of the invention, a web service description is embodied in a WSDL file. WSDL files include all the information needed to use a web service including the format of the message web server 405 is expecting, and the location of web server 405 on a network. Furthermore, WSDL files can be converted into code which will invoke a web service.

WSDL defines services as collections of network communication endpoints or ports capable of exchanging messages. In WSDL, the abstract definition of endpoints and messages is separated from their concrete network deployment or data format bindings. This allows the reuse of abstract definitions of messages, which are abstract descriptions of the data being exchanged, and port types, which are abstract collections of operations. The concrete protocol and data format specifications for a particular port type constitute a reusable binding. A port is defined by associating a network address with a reusable binding, and a collection of ports defines a service. Accordingly, a WSDL document uses the following elements (also referred to herein as web service description elements):

Types:
  a container for data type definitions using some type system (e.g. XML Schema Definition or XSD);
Message:
  an abstract, typed definition of the data being communicated;
Operation:
  an abstract description of an action supported by the service;
Port Type:
  an abstract set of operations supported by one or more endpoints;

Binding:
: a concrete protocol and data format specification for a particular port type;

Port:
: a single endpoint defined as a combination of a binding and a network address; and Service:
: a collection of related endpoints.

While SOAP may be used as the invocation protocol for communications between mobile device 202 and web server 405, other protocols and message formats may also be used to communicate with a web service (e.g. HTTP GET/POST, Multipurpose Internet Mail Extensions or MIME).

Embodiments of the invention relate generally to web services, and more specifically to methods that facilitate the combination or aggregation of web services, but which do not require programmers to write customized code. In accordance with one embodiment of the invention, a user interface (UI) is generated automatically from a web services description. In this embodiment, information in the web services description is used to combine web services.

Aggregation of web services may also be user-driven. In this case, the aggregation is driven by the consumption of individual web services by a user. In one embodiment of the invention, output data from web services being displayed to a user through a user interface and input data entered by a user through the user interface are monitored. In this embodiment, relationships between web services can be inferred from patterns in the monitored data. These relationships may suggest which web services may be combined. In another embodiment of the invention, relationships between web services may be inferred from the actions of a user manipulating a user interface while consuming a web service. Specific user actions (e.g. when a user copies output data from an invoked web service, to an input field used to provide input data to another web service) can be detected in determining which web services can be combined.

Aggregation of web services may also be performed by a user, where the user explicitly specifies how web services should be combined. In one embodiment of the invention, the user combines web services through a menu-driven interface in which web services available for aggregation are displayed.

In embodiments of the invention described above, the aggregation of web services is automated, so that the intervention of a human programmer to write customized client applications is not required to perform the aggregation. Other features of these embodiments of the invention will now be described in greater detail with reference to FIG. 5 through FIG. 7.

Figure 5:
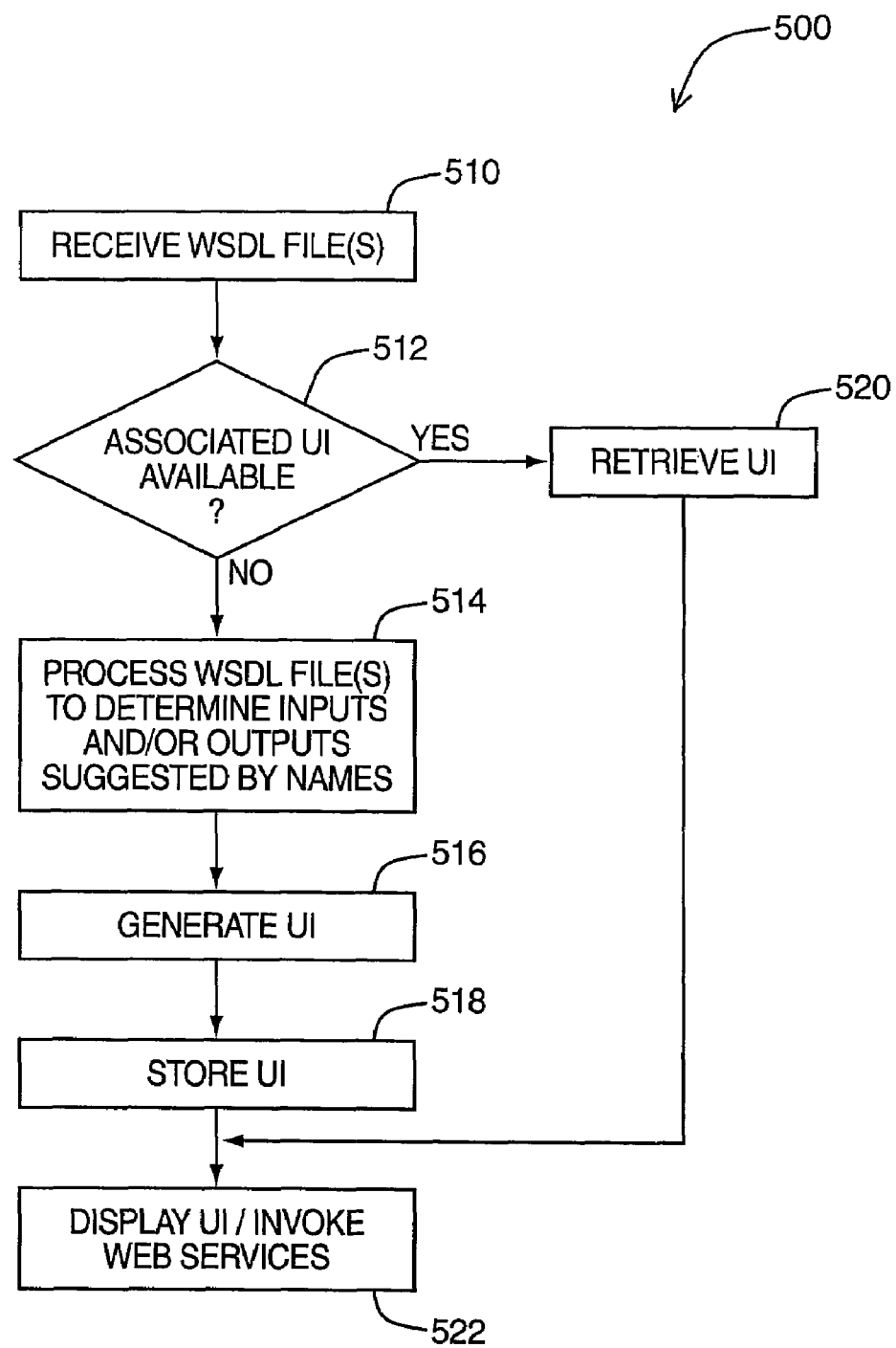
FIG. 5 is a flowchart illustrating a method of aggregating web services in generating a user interface in accordance with an embodiment of the invention.

Referring to FIG. 5, a flowchart illustrating a method of aggregating web services in generating a user interface in accordance with an embodiment of the invention is shown generally as 500.

At step 510, one or more web service descriptions are received by the computing device (e.g. mobile device 202 of FIG. 4), as may be required to support one or more applications to be executed on the mobile device. For example, a web services description may be in the form of a WSDL file. Where the computing device is a mobile device, optionally, the web services description may be optimized by a web services accelerator before it is received by the mobile device, as described in a co-pending application by the same inventors entitled AN APPARATUS AND METHOD FOR PROCESSING WEB SERVICE DESCRIPTIONS, the contents of which are incorporated herein by reference. The WSDL file may be obtained from a location identified on the UDDI registry, for example. Other registry methods can also be used to locate the appropriate WSDL file, including vendor specific registry protocols and human readable web based systems, for example.

Web service descriptions received at this step comprise various web service description elements, and may be processed in accordance with this embodiment of the invention if the web description elements contain names of web services and inputs to web services that adhere to a predetermined naming convention. The naming convention facilitates determinations of whether an input to one web service may be obtained by invoking another web service. Put another way, the naming convention may give hints on how various web services interrelate.

For instance, aggregation may be inferred from the structure of a WSDL file. WSDL files can describe several logical services and are themselves a form of aggregation. Information in the WSDL may be used to combine web services if the author of the WSDL file used some specific naming convention to provide hints on how individual web services should be combined. The naming convention may be a standardized convention or one that is applied only to a specific set of one or more web services.

Consider the following example. Suppose a WSDL file describes the following three web services:

(a) getISBN: which takes strings Title and Author as input and returns an integer;
(b) getPrice: which takes an integer ISBN as input and returns a floating-point number; and
(c) order: which takes an integer ISBN as input and returns a string.

In this example, the naming convention used specifies that a web service having name get<variable> will return a value <variable>, which can then be used as inputs to other web services. In this case, getISBN is a web service that returns data that can be associated with the name ISBN. When ISBN is used as the name of an input to one or more other web services (e.g. getPrice and order), an inference can be made that the output of getISBN may be used as an input to these other web services.

At step 512, the computing device receiving the web service descriptions at step 510 may determine if an associated user interface has been previously generated, which already reflects an aggregation of associated web services. This step may be performed if re-processing of the web service descriptions to aggregate associated web services is not desired. In variant embodiments of the invention, the determination made at this step may be performed remotely from the computing device for which the user interface will be generated (e.g. by a web services accelerator on a remote server).

At step 514, if an associated user interface has not been previously generated, or where a re-processing of web service descriptions received at step 510 is desired, the web service descriptions are processed by parsing the web service descriptions to determine inputs and outputs to associated web services, and to identify any instances where the input to a web service might be obtained by invoking another web service (i.e. either by invoking a different web service, or through another invocation of the same web service) as suggested by the names of the web services and inputs to the web services described in the web service descriptions.

At step 516, a user interface is generated from the web service descriptions, which may aggregate a number of web services (and/or instances where a web service is invoked) based on determinations made during the processing of the web service descriptions at step 514. In this embodiment of the invention, the user interface is generated by the computing device, although in variant embodiments of the invention, this step may be performed by a device different from the computing device on which the user interface will be used (e.g. by a web services accelerator on a remote server).

The user interface may be generated using any of a number of known methods. For example, the user interface may be generated by producing code, which can be executed immediately after it is produced, or concurrently as it is produced. Alternatively, the code may be temporarily stored in a storage device or memory for subsequent execution. The code may be produced in the form of an executable application, or be in the form of source code to be subsequently compiled into an executable format, for example. The code may be in the form of data that can be used by other applications or interfaces (e.g. web browsers) to provide the user interface to users.

The user interface generated at this step aggregates web services, such that the outputs of one or more web services when invoked (which may or may not themselves require input data in order to be invoked) can be used as inputs to one or more different web services or further invocations of the same web service. Accordingly, while a given user interface may require multiple web services to be invoked, some of these web services can be invoked automatically without requiring the user to provide additional input to each web service or to manually invoke each web service.

The user interface is adapted to prompt a user for input data and receive input data where required to invoke one or more web services. It will generally be necessary to obtain input data from the user when the data required to invoke a web service cannot be obtained by invoking other available web services either directly or indirectly using input data already received. The user interface is further adapted to invoke at least one web service to obtain output data (e.g. using input obtained from the user, using input obtained from previous invocations of web services, using input taken from the state of the device such as the available memory, using input taken from the device environment such as location, using any other parameter available to the device as input, or using no input if it is not required by the web service), and to automatically invoke another web service using that output data as input thereto (and possibly other inputs as noted above) if appropriate, as determined at step 514. The latter web service need not necessarily be a different web service, but may alternatively be a subsequent invocation of the former web service. The user interface may then use the output data from the latter web service in a similar manner (e.g. as input data to automatically invoke yet another web service), and/or display the output data from the latter web service in a desired output format to a user.

Optionally, at step 518, the user interface generated at step 516 may be stored in a storage device or memory for later retrieval at step 520 in the event that the generated user interface is to be re-used, as may be determined at step 512. Techniques used to track user interfaces that can be re-used (e.g. a data table to associate certain sets of one or more WSDL files with a user interface) as known in the art may be implemented. The storage device may be locally coupled to the computing device, or located remote from the computing device, for example. User interfaces that have been generated and stored may themselves offer functionality that can be provided as web services.

At step 522, the user interface generated at step 516 is provided to the user, through a display of the computing device for example. If necessary, the user interface is retrieved from a remote device. User interaction through the user interface causes one or more web services to be invoked, as may be dictated by the user interface. Due to the aggregation of web services in the user interface, it is not necessary for the user to provide input data to invoke each web service that the user interface might access. The aggregation allows the output of one or more web services to be automatically used as inputs to other web services (or other invocations of the same web services).

Figure 6:
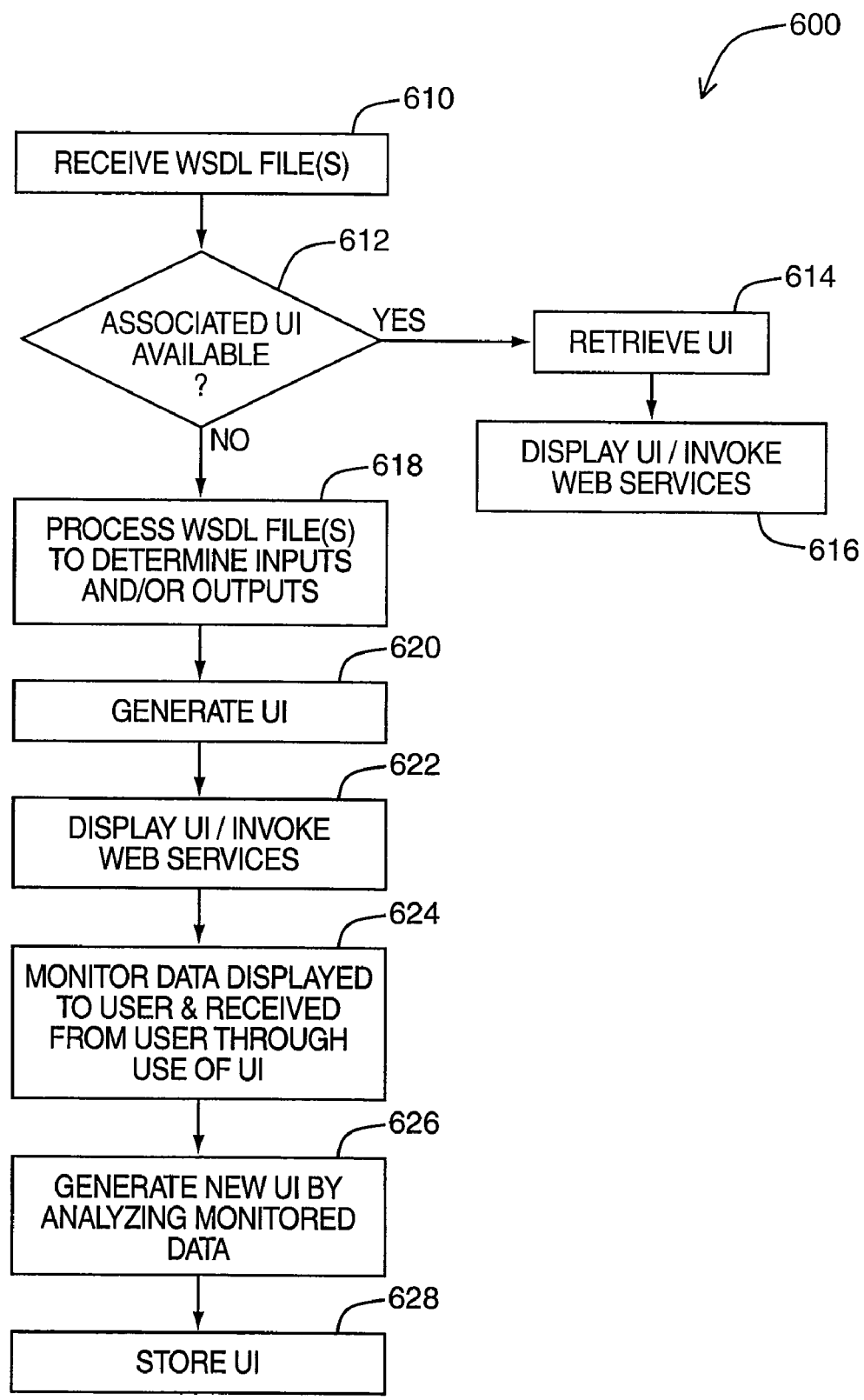
FIG. 6 is a flowchart illustrating a method of aggregating web services in generating a user interface in accordance with another embodiment of the invention.

Referring to FIG. 6, a flowchart illustrating a method of aggregating web services in generating a user interface in accordance with another embodiment of the invention is shown generally as 600.

At step 610, one or more web service descriptions are received by the computing device (e.g. mobile device 202 of FIG. 4), as may be required to support one or more applications to be executed on the mobile device. For example, a web services description may be in the form of a WSDL file. Where the computing device is a mobile device, optionally, the web services description may be optimized by a web services accelerator before it is received by the mobile device. The WSDL file may be obtained from a location identified on the UDDI registry, for example. Other registry methods can also be used to locate the appropriate WSDL file, including vendor specific registry protocols and human readable web based systems, for example.

At step 612, the computing device receiving the web service descriptions at step 610 may determine if an associated user interface has been previously generated, which already reflects an aggregation of associated web services. This step may be performed if re-processing of the web service descriptions to aggregate associated web services is not desired. In variant embodiments of the invention, the determination made at this step may be performed remotely from the computing device for which the user interface will be generated (e.g. by a web services accelerator on a remote server). If a previously generated user interface is available, the user interface is retrieved at step 614 (from a remote device if necessary), and provided to the user at step 616, through a display of the computing device for example. User interaction through the user interface causes one or more web services to be invoked, as may be dictated by the user interface.

At step 618, if an associated user interface has not been previously generated, or where a re-processing of web service descriptions received at step 610 is desired, the web service descriptions are processed by parsing the web service descriptions to determine inputs and outputs to associated web services. In variant embodiments of the invention, the determination made at this step may be performed remotely from the computing device for which the user interface will be generated (e.g. by a web services accelerator on a remote server).

At step 620, a user interface is generated from the web service descriptions, based on determinations made during the processing of the web service descriptions at step 618. In this embodiment of the invention, the user interface is generated by the computing device, although in variant embodiments of the invention, this step may be performed by a device different from the computing device on which the user interface will be used (e.g. by a web services accelerator on a remote server).

At step 622, the user interface generated at step 620 is provided to the user, through a display of the computing device for example. If necessary, the user interface is retrieved from a remote device. User interaction through the user interface causes one or more web services to be invoked, as may be dictated by the user interface.

At step 624, input data received as input by users to invoke web services, and output data output by invoked web services and displayed to users through one or more user interfaces are monitored. Patterns in the input data input by users and output data displayed to users that suggest that an input to one web service may be obtained by invoking another web service are identified. In this manner, aggregation of web services may be performed as inferred from user interactions.

Consider the following example. Suppose a WSDL file describes the following three web services:
(a) getISBN: which takes two strings as input and returns an integer;
(b) getPrice: which takes an integer as input and returns a floating-point number; and
(c) order which takes an integer as input and returns a string.

Assume that the user interface automatically generated at step 620 prompts users for inputs to each of these web services, and that each web service can be invoked separately. If the user causes getISBN to be invoked, and in monitoring the input data entered through the user interface, it is determined that the output of getISBN as displayed to the user was subsequently entered by the user as input to getPrice and order, an inference can be made that the output from getISBN should serve as input data to getPrice and order. Determining whether this inference can be employed to aggregate these web services may initially require examining multiple occurrences of such user interactions, to detect the pattern. Optionally, when a possible pattern is detected, a confirmation from the user that the inference can be validly drawn may be obtained.

In a variant embodiment of the invention, the user interface generated at step 620 may be adapted to provide means for users to explicitly indicate whether an input to one web service may be obtained by invoking another web service while consuming the web services. Specific user interactions in which users make such indications may be monitored and detected. For example, a function representing "cut & paste" or "copy & paste" may be made available (e.g. through one or more keys, one or more selections from a menu, etc.) to the user. Using this function, the user may copy output data received from one web service to an input field where input data to another web service is to be entered. Use of this function is monitored and its detection may provide information required to aggregate the associated web services.

In another variant embodiment of the invention, a user interface for customizing web services is generated at step 620 that permits users to explicitly associate web services with each other by identifying which inputs of a specific web service may be obtained by invoking another web service (or by another invocation of the same web service). This is accomplished through as series of customization actions as performed by the user, in which associations between various web services are made, using menu-based selections, drag-and-drop techniques, or other techniques known in the art. Web services may or may not be actually invoked during the customization process in this embodiment of the invention. In this embodiment, the user interface generated at step 620 presents the user with a list of web services. The user may then select a first web service. Instead of providing actual data as input for the web service, a second web service may be selected from a menu and associated with that input, to indicate that the output of the second selected web service should be obtained and used as input for the first selected web service. The web services displayed in the menu from which the user selects a second web service may be filtered as appropriate. For example, only web services having an output type that matches the input type to the first web service may be displayed in the menu, for selection by the user as the second web service. At step 624, associations made by the user performing customization actions at this step through the user interface for customizing web services are monitored and recorded. This facilitates the aggregation of web services as defined by the associations.

At step 626, a new user interface is generated by analyzing data obtained by monitoring the user interface generated at step 620. In this embodiment of the invention, the user interface is generated by the computing device, although in variant embodiments of the invention, this step may be performed by a device different from the computing device on which the user interface will be used (e.g. by a web services accelerator on a remote server).

The new user interface generated at step 626 aggregates web services, such that the outputs of one or more web services when invoked (which may or may not themselves require input data in order to be invoked) can be used as inputs to one or more different web services or further invocations of the same web service. Accordingly, while a given user interface may require multiple web services to be invoked, some of these web services can be invoked automatically without requiring the user to provide additional input to each web service or to manually invoke each web service.

The new user interface is adapted to prompt a user for input data and receive input data where required to invoke one or more web services. It will generally be necessary to obtain input data from the user when the data required to invoke a web service cannot be obtained by invoking other available web services either directly or indirectly using input data already received. The user interface is further adapted to invoke at least one web service to obtain output data (e.g. using input obtained from the user, using input obtained from previous invocations of web services, using input taken from the state of the device such as the available memory, using input taken from the device environment such as location, using any other parameter available to the device as input, or using no input if it is not required by the web service), and to automatically invoke another web service using that output data as input thereto (and possibly other inputs as noted above) if appropriate, as determined at step 624. The latter web service need not necessarily be a different web service, but may alternatively be a subsequent invocation of the former web service. The user interface may then use the output data from the latter web service in a similar manner (e.g. as input data to automatically invoke yet another web service), and/or display the output data from the latter web service in a desired output format to a user.

At step 628, the new user interface generated at step 626 is stored in a storage device or memory for later retrieval (e.g. at step 614). Techniques used to track user interfaces that for re-use (e.g. a data table to associate certain sets of one or more WSDL files with a user interface) as known in the art may be implemented. The storage device may be locally coupled to the computing device, or located remote from the computing device, for example. User interfaces that have been generated and stored may themselves offer functionality that can be provided as web services.

The user interfaces generated at steps 620 and 626 may be generated using any of a number of known methods. For example, each user interface may be generated by producing code, which can be executed immediately after it is produced, or concurrently as it is produced. Alternatively, the code may be temporarily stored in a storage device or memory for subsequent execution. The code may be produced in the form of an executable application, or be in the form of source code to be subsequently compiled into an executable format, for example. The code may be in the form of data that can be used by other applications or interfaces (e.g. web browsers) to provide the respective user interface to users.

Figure 7:
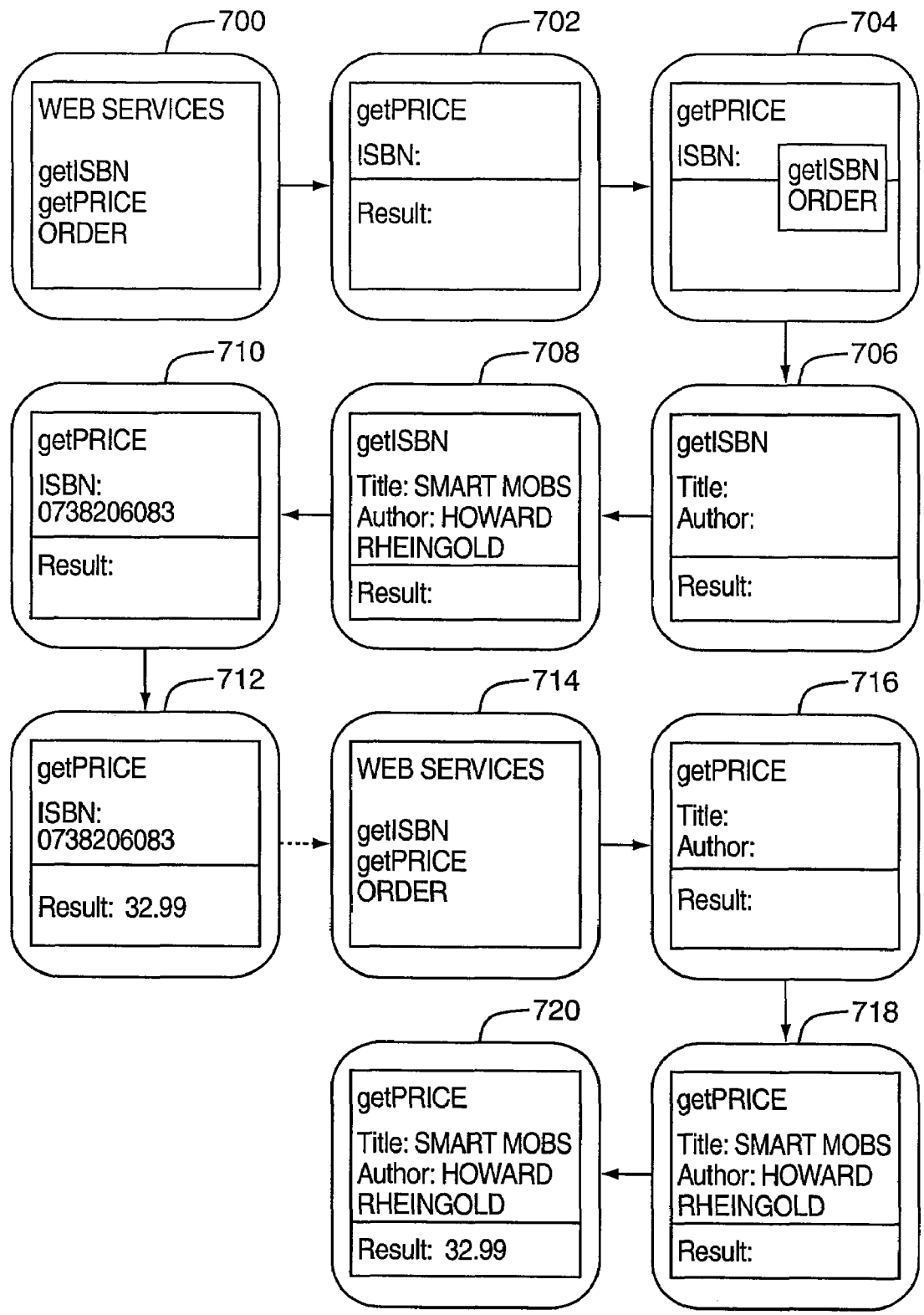
FIG. 7 is a schematic diagram depicting a series of example screens displayed to a user in an example implementation of an embodiment of the invention.

Referring to FIG. 7, a schematic diagram depicting a series of example screens displayed to a user in an example implementation of an embodiment of the invention is provided.

In this example, screens 700 to 712 depict displays of pages from an example user interface that permits a user to explicitly associate a number of web services through a menu-driven user interface for customizing web services, as described with reference to FIG. 6 in respect of a variant embodiment of the invention, for example. Screens 714 to 720 depict displays from an example user interface in which web services have been aggregated. It will be understood by persons skilled in the art that the information necessary to generate the example user interface in which web services have been aggregated may be obtained by implementations of other embodiments of the invention.

In this example, information to aggregate web services in a book-ordering interface is collected. A user is presented with a list of web services in screen 700. After the user selects getPrice, a new form as shown in screen 702 is displayed. Instead of filling in the input field for ISBN, the user brings up a menu (e.g. by right-clicking a mouse) that lists other web services as shown in screen 704. A filter has been applied so that input type of the ISBN web service is matched to the output type of the web services listed in the menu. The user selects getISBN from the menu, which brings up a form requesting inputs to the getISBN web service as shown in screen 706. The user completes the request as shown in screen 708. The getISBN web service is invoked and the output of this web service is shown in the form for the getPrice web service in the appropriate field, as shown in screen 710. The getPrice web service is invoked, and output from this web service is received, as shown in screen 712. If desired, the outputs obtained from either the getISBN or getPrice web services may be subsequently used, to order the book identified by an ISBN number using the available web service [subsequent steps not shown]. The customization actions described above may then be stored in a memory or storage device.

A screen of a book-ordering interface is shown as 714. When the user selects getPrice, a form shown in screen 716 automatically incorporating the input fields of the getISBN web services is provided. The user completes the form as shown in screen 718, and submits the request. The request to getPrice actually makes two web service calls: one to getISBN and one to getPrice. However, the aggregation of these web services is invisible to the user when using this interface. The result of the getPrice call is displayed in screen 720.

Embodiments of the invention relate generally to web services, and more particularly to a method of aggregating web services in the generation of user interfaces for computing devices. While embodiments of the invention may be implemented for use with wireless or mobile devices as described above, by way of example, with reference to FIG. 1 through FIG. 3, it will be understood by persons skilled in the art that embodiments of the invention may be implemented for use with other computing devices, which need not be wireless. Embodiments of the invention may be applied to both wireless and wireline consumption of web services.

In variant embodiments of the invention, information needed to aggregate various web services may be stored as meta data in a web service description file. The meta data can be used to suggest which specific web services can be aggregated, and how the web services may be aggregated. The meta data can provide hints as to various aggregation properties, including for example: which outputs of which specific web services need not be displayed to a user, which web services invocations must be made separately from others and the order in which specific web services must be invoked to achieve aggregation, which specific web services requires explicit user interaction, and which web services may be invoked automatically without explicit user interaction. One or more of these aggregation properties may alternatively be explicitly defined by a user through a user interface.

In variant embodiments of the invention, instructions for performing the steps of a method of processing a web service description in an embodiment of the invention may be stored on computer-readable media, which may include physical or transmission-type media, for example.

The invention has been described with regard to a number of embodiments. However, it will be understood by persons skilled in the art that other variants and modifications may be made without departing from the scope of the invention as defined in the claims appended hereto.

The invention claimed is:

1. A method of aggregating web services in generating a user interface for a computing device, the method comprising:
   receiving at least one web service description, wherein said at least one web service description comprises a plurality of web service description elements that define a web service interface to each of a plurality of web services;
   processing said at least one web service description to identify inputs to and outputs from associated web services;
   generating one or more user interfaces through which input data is obtainable and output data is displayable;
   providing said one or more user interfaces, wherein in use, at least a subset of said plurality of web services is invoked using input data obtained through said one or more user interfaces, and wherein output data is displayed through said one or more user interfaces from said at least a subset of said plurality of web services;
   monitoring said input data obtained and said output data displayed during use of said one or more user interfaces to identify patterns in said input data and said output data that suggest that an input to a first web service of said plurality of web services is obtainable from output of a second web service of said plurality of web services; and
   generating a new user interface for said computing device if said patterns are identified, wherein in use, the first web service is automatically invoked using output data from the second web service when the second web service is invoked through said new user interface.

2. The method of claim 1, wherein said new user interface is adapted to display output data from said first web service.

3. The method of claim 1, further comprising generating code for said user interface, and storing said code in a storage device.

4. The method of claim 3, further comprising the step of transmitting said code from said storage device to said computing device.

5. The method of claim 3, further comprising executing said code on said computing device.

6. The method of claim 1, wherein said new user interface is adapted to prompt for input data and receive said input data in said new user interface for invoking said second web service.

7. The method of claim 1, wherein said patterns are identified by detecting instances where said input data obtained through said one or more user interfaces matches output data displayed through said one or more user interfaces.

8. The method of claim 1, wherein said patterns are identified by detecting instances in which selected data from output data displayed to said at least one user through said one or more user interfaces is copied to an input field on said one or more user interfaces, in which data in said input field is used to invoke a web service.

9. An apparatus programmed to perform a method of aggregating web services in generating a user interface for a physical computing device, comprising a microprocessor configured to perform acts comprising:

receiving at least one web service description, wherein said at least one web service description comprises a plurality of web service description elements that define a web service interface to each of a plurality of web services;

processing said at least one web service description to identify inputs to and outputs from associated web services;

generating one or more user interfaces through which input data is obtainable and output data is displayable;

providing said one or more user interfaces, wherein in use, at least a subset of said plurality of web services is invoked using input data obtained through said one or more user interfaces, and wherein output data is displayed through said one or more user interfaces from said at least a subset of said plurality of web services;

monitoring said input data obtained and said output data displayed during use of said one or more user interfaces to identify patterns in said input data and said output data that suggest that an input to a first web service of said plurality of web services is obtainable from output of a second web service of said plurality of web services; and generating a new user interface for said computing device if said patterns are identified, wherein in use, the first web service is automatically invoked using output data from the second web service when the second web service is invoked through said new user interface.

10. The apparatus of claim 9, wherein the apparatus is a mobile device.

11. The apparatus of claim 9, wherein said new user interface is adapted to display output data from said first web service.

12. The apparatus of claim 9, said acts further comprising generating code for said user interface, and storing said code in a storage device.

13. The apparatus of claim 12, said acts further comprising transmitting said code from said storage device to said computing device.

14. The apparatus of claim 12, said acts further comprising executing said code on said computing device.

15. The apparatus of claim 9, wherein said new user interface is adapted to prompt for input data and receive said input data in said new user interface for invoking said second web service.

16. The apparatus of claim 9, wherein said patterns are identified by detecting instances where said input data obtained through said one or more user interfaces matches output data displayed through said one or more user interfaces.

17. The apparatus of claim 9, wherein said patterns are identified by detecting instances in which selected data from output data displayed to said at least one user through said one or more user interfaces is copied to an input field on said one or more user interfaces, in which data in said input field is used to invoke a web service.

18. A physical computer-readable medium upon which a set of software components is stored, the software components containing instructions for performing the steps in a method of aggregating web services in generating a user interface for a computing device, the instructions for:

receiving at least one web service description, wherein said at least one web service description comprises a plurality of web service description elements that define a web service interface to each of a plurality of web services;

processing said at least one web service description to identify inputs to and outputs from associated web services;

generating one or more user interfaces through which input data is obtainable and output data is displayable;

providing said one or more user interfaces, wherein in use, at least a subset of said plurality of web services is invoked using input data obtained through said one or more user interfaces, and wherein output data is displayed through said one or more user interfaces from said at least a subset of said plurality of web services;

monitoring said input data obtained and said output data displayed during use of said one or more user interfaces to identify patterns in said input data and said output data that suggest that an input to a first web service of said plurality of web services is obtainable from output of a second web service of said plurality of web services; and generating a new user interface for said computing device if said patterns are identified, wherein in use, the first web service is automatically invoked using output data from the second web service when the second web service is invoked through said new user interface.

* * * * *